(12) United States Patent
Chen et al.

(10) Patent No.: US 9,308,908 B2
(45) Date of Patent: Apr. 12, 2016

(54) METHOD OF SHIFTING A TRANSMISSION

(71) Applicant: FORD GLOBAL TECHNOLOGIES, LLC, Dearborn, MI (US)

(72) Inventors: Weitian Chen, Windsor (CA); Hong Jiang, Birmingham, MI (US); Bradley Dean Riedle, Northville, MI (US); Vladimir Ivanovic, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 302 days.

(21) Appl. No.: 14/051,117

(22) Filed: Oct. 10, 2013

(65) Prior Publication Data
US 2015/0105218 A1    Apr. 16, 2015

(51) Int. Cl.
| | | |
|---|---|---|
| F16H 61/04 | (2006.01) | |
| B60W 10/06 | (2006.01) | |
| B60W 10/11 | (2012.01) | |
| F16H 61/02 | (2006.01) | |

(52) U.S. Cl.
CPC ............... B60W 10/06 (2013.01); B60W 10/11 (2013.01); F16H 61/0437 (2013.01); *F16H 61/0204* (2013.01); *F16H 2061/0444* (2013.01); *F16H 2061/0451* (2013.01); *F16H 2061/0455* (2013.01); *F16H 2061/0462* (2013.01); *F16H 2306/52* (2013.01); *Y10T 477/677* (2015.01)

(58) Field of Classification Search
CPC ................... F16H 61/0204; F16H 2061/0455; F16H 2061/0462; F16H 2061/0451; F16H 2306/14
See application file for complete search history.

(56) References Cited

U.S. PATENT DOCUMENTS

| | | | |
|---|---|---|---|
| 4,792,902 A | 12/1988 | Hrovat et al. | |
| 4,796,490 A | 1/1989 | Butts et al. | |
| 5,897,456 A * | 4/1999 | Takiguchi | F16H 61/061 477/146 |
| 6,385,520 B1 * | 5/2002 | Jain | F16H 61/061 701/51 |
| 7,349,785 B2 | 3/2008 | Lee et al. | |
| 7,713,170 B2 * | 5/2010 | Jeon | F16H 61/061 477/159 |
| 2002/0147071 A1 * | 10/2002 | Hayabuchi | B60W 10/115 477/68 |

\* cited by examiner

*Primary Examiner* — Ramya Burgess
*Assistant Examiner* — David Morris
(74) *Attorney, Agent, or Firm* — James Dottavio; Brooks Kushman P.C.

(57) ABSTRACT

A method of down-shifting a transmission avoids output shaft oscillations by briefly increasing the torque capacity of an off-going element at the end of the inertia phase. The torque capacity of the off-going element is then reduced to zero when the measured transmission speed ratio begins to decrease. The method is suitable for downshifts that involve multiple off-going elements and multiple on-coming elements such as a shift from tenth gear to sixth gear in a ten speed transmission.

14 Claims, 4 Drawing Sheets

METHOD OF SHIFTING A TRANSMISSION

TECHNICAL FIELD

This disclosure relates to the field of automatic transmissions for motor vehicles. More particularly, the disclosure pertains to a method of changing among speed ratios.

BACKGROUND

Many vehicles are used over a wide range of vehicle speeds, including both forward and reverse movement. Some types of engines, however, are capable of operating efficiently only within a narrow range of speeds. Consequently, transmissions capable of efficiently transmitting power at a variety of speed ratios are frequently employed. Transmission speed ratio is the ratio of input shaft speed to output shaft speed. When the vehicle is at low speed, the transmission is usually operated at a high speed ratio such that it multiplies the engine torque for improved acceleration. At high vehicle speed, operating the transmission at a low speed ratio permits an engine speed associated with quiet, fuel efficient cruising.

When driving conditions change, an automatic transmission changes from one speed ratio to another speed ratio. For example, when a vehicle is cruising using a low speed ratio and a driver demands an increase in wheel torque, the transmission must downshift into a higher speed ratio. For sudden changes in driver demanded wheel torque, the transmission may skip over one or more available gear ratios in a single shift event. Many automatic transmissions have multiple shift elements, such as clutches or brakes, and select particular speed ratios by engaging particular subsets of the shift elements. To perform a shift from one speed ratio to another, one or more previously engaged shift elements are released and one or more previously disengaged shift elements are engaged. Passenger comfort is maximized if the transition is accomplished smoothly. Performance is maximized if the transition is accomplished quickly. These considerations are often in conflict.

SUMMARY OF THE DISCLOSURE

A method of shifting a transmission includes maintaining a first offgoing element in a fully engaged condition while operating in a first transmission speed ratio, reducing the torque capacity of the first offgoing element during an inertia phase, and then increasing the torque capacity of the first offgoing element at the end of the inertia phase to prevent output shaft oscillation. A first oncoming clutch is engaged at the end of the inertia phase. The torque capacity of the first offgoing clutch is then decreased to zero in response to the measured transmission speed ratio decreasing. The method may be utilized as part of double transition shift that includes releasing a second offgoing clutch and engaging a second oncoming clutch during the inertia phase. The elements may be either brakes or clutches.

In another embodiment, a transmission includes at least first and second elements and a controller programmed to downshift from a first speed ratio in which the first clutch is engaged to and the second clutch is disengaged to a second speed ratio in which the first clutch is disengaged and the second clutch is engaged by increasing the torque capacity of the first clutch at the end of the inertia phase. The transmission may also include a third clutch which is engaged in the first speed ratio and disengaged in the second speed ratio and a fourth clutch that is disengaged in the first speed ratio and engaged in the second speed ratio.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
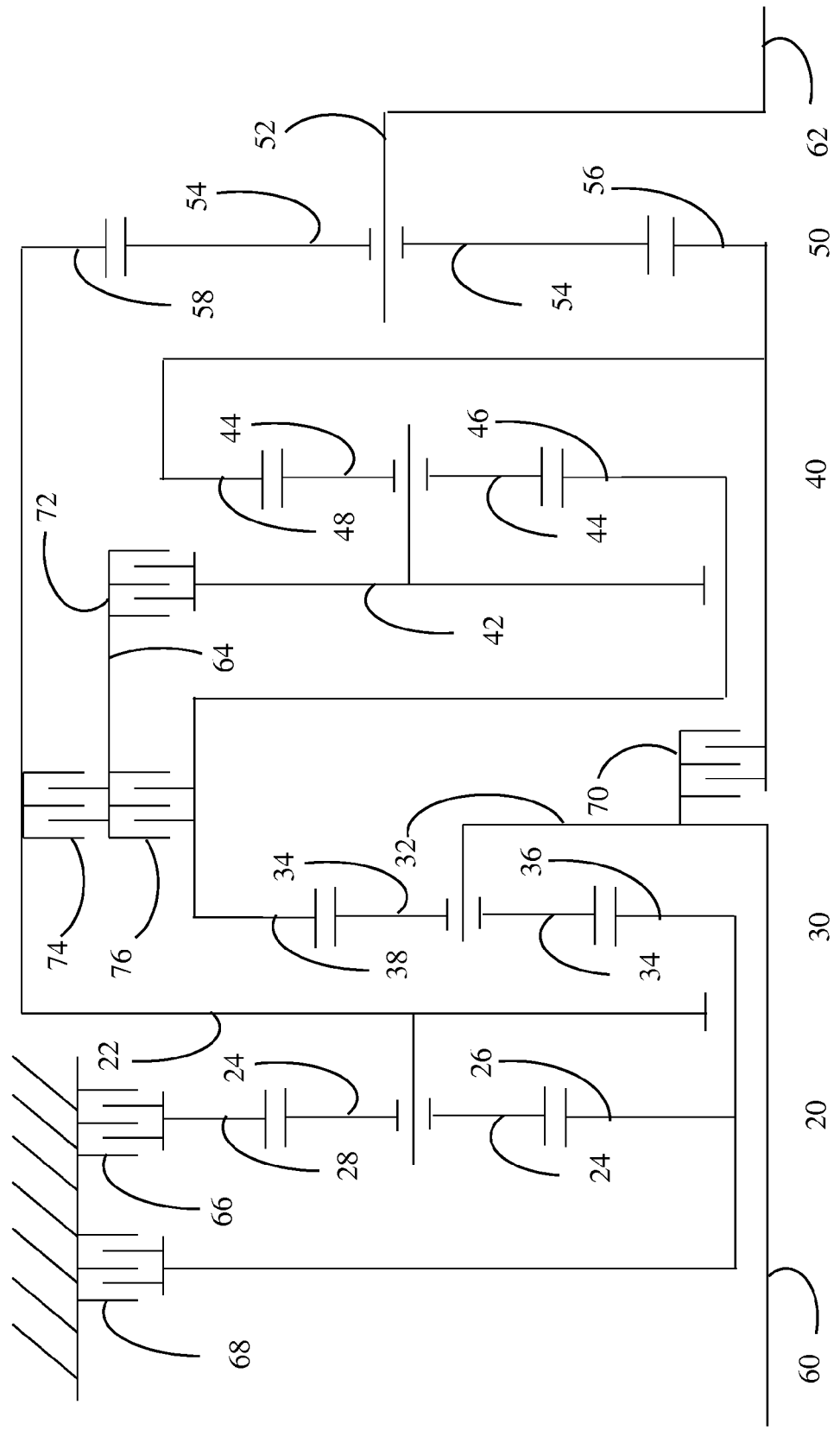
FIG. 1 is a schematic diagram of an exemplary transmission gearing arrangement.

An example transmission is schematically illustrated in FIG. 1. The transmission utilizes four simple planetary gear sets 20, 30, 40, and 50. Sun gear 26 is fixed to sun gear 36, carrier 22 is fixed to ring gear 58, ring gear 38 is fixed to sun gear 46, ring gear 48 is fixed to sun gear 56, input shaft 60 is fixed to carrier 32, and output shaft 62 is fixed to carrier 52. Ring gear 28 is selectively held against rotation by brake 66 and sun gears 26 and 36 are selectively held against rotation by brake 68. Input shaft 60 is selectively coupled to ring gear 48 and sun gear 56 by clutch 70. Intermediate shaft 64 is selectively coupled to carrier 42 by clutch 72, selectively coupled to carrier 22 and ring gear 58 by clutch 74, and selectively coupled to ring gear 38 and sun gear 46 by clutch 76.

As shown in Table 1, engaging the clutches and brakes in combinations of four establishes ten forward speed ratios and one reverse speed ratio between input shaft 60 and output shaft 62. An X indicates that the corresponding shift element is engaged to establish the speed ratio.

TABLE 1

|  | 66 | 68 | 70 | 72 | 74 | 76 | Ratio | Step |
|---|---|---|---|---|---|---|---|---|
| Rev | X | X |  | X | X |  | −4.79 | 102% |
| 1$^{st}$ | X | X | X | X |  |  | 4.70 |  |
| 2$^{nd}$ | X | X |  | X |  | X | 2.99 | 1.57 |
| 3$^{rd}$ | X |  | X | X |  | X | 2.18 | 1.37 |
| 4$^{th}$ | X |  |  | X | X | X | 1.80 | 1.21 |
| 5$^{th}$ | X |  | X |  | X | X | 1.54 | 1.17 |
| 6$^{th}$ | X |  | X | X | X |  | 1.29 | 1.19 |
| 7$^{th}$ |  |  | X | X | X | X | 1.00 | 1.29 |
| 8$^{th}$ |  | X | X | X | X |  | 0.85 | 1.17 |
| 9$^{th}$ |  | X | X |  | X | X | 0.69 | 1.24 |
| 10$^{th}$ |  | X |  | X | X | X | 0.64 | 1.08 |

All single step and two step shifts are performed by gradually engaging one shift element, called an oncoming element (ONC) while gradually releasing a different shift element, called the offgoing element (OFG). During each of these shifts, three shift elements, called holding elements, are maintained fully engaged while one shift element is maintained fully disengaged. In other transmission arrangements, the number of holding elements may be different.

During a downshift, the engine speed must increase to match the new speed ratio. The output torque may decrease while some of the power is diverted to increasing engine speed rather than being transmitted to the output. Also, since shift elements are slipping during a shift, some of the power is converted to heat, exacerbating the output torque deficiency.

Sometimes, it is desirable to downshift by more than two ratio steps. For example, if the vehicle driver presses the accelerator pedal to pass another vehicle while cruising on the highway in top gear, the shift scheduling algorithm may demand a multiple step downshift. For some multiple step downshifts, two shift elements must be releases and two shift elements must be engaged. For example, to shift from 10th gear in the example transmission to 6th gear in the example transmission, brake 68 (OFG1) and clutch 76 (OFG2) must be released and clutch 70 (ONC1) and brake 66 (ONC2) must be engaged. While it is possible to complete such a shift in two stages, by shifting temporarily into 8th gear for example, completing the shift in that manner would require more time and result in more output torque disturbance than making the shift in a single process. Fluctuating output torque tends to be annoying to the driver as it translates directly into fluctuating vehicle acceleration.

Figure 2:
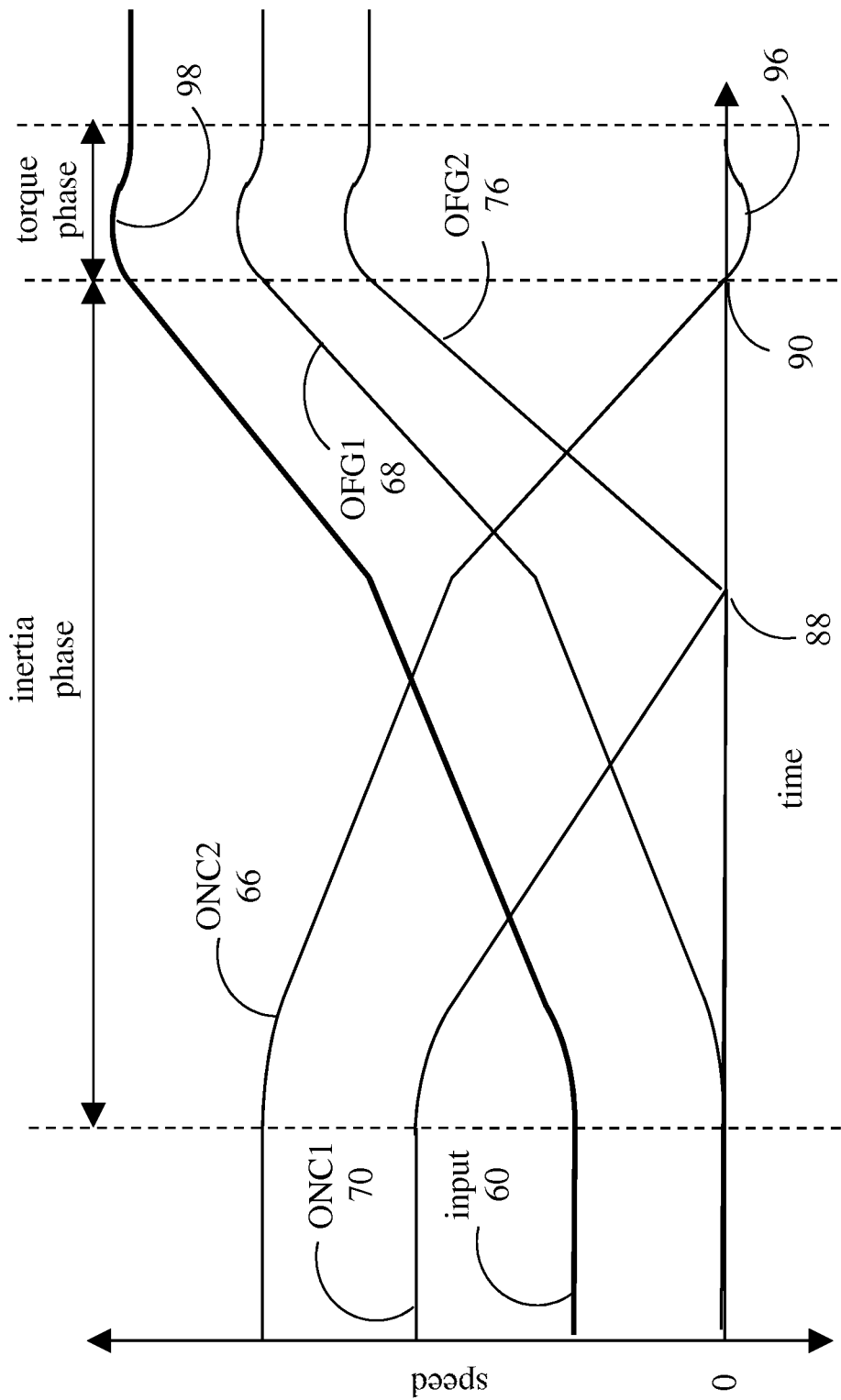
FIG. 2 is a graph illustrating speed relationships during execution of a downshift.
Figure 3:
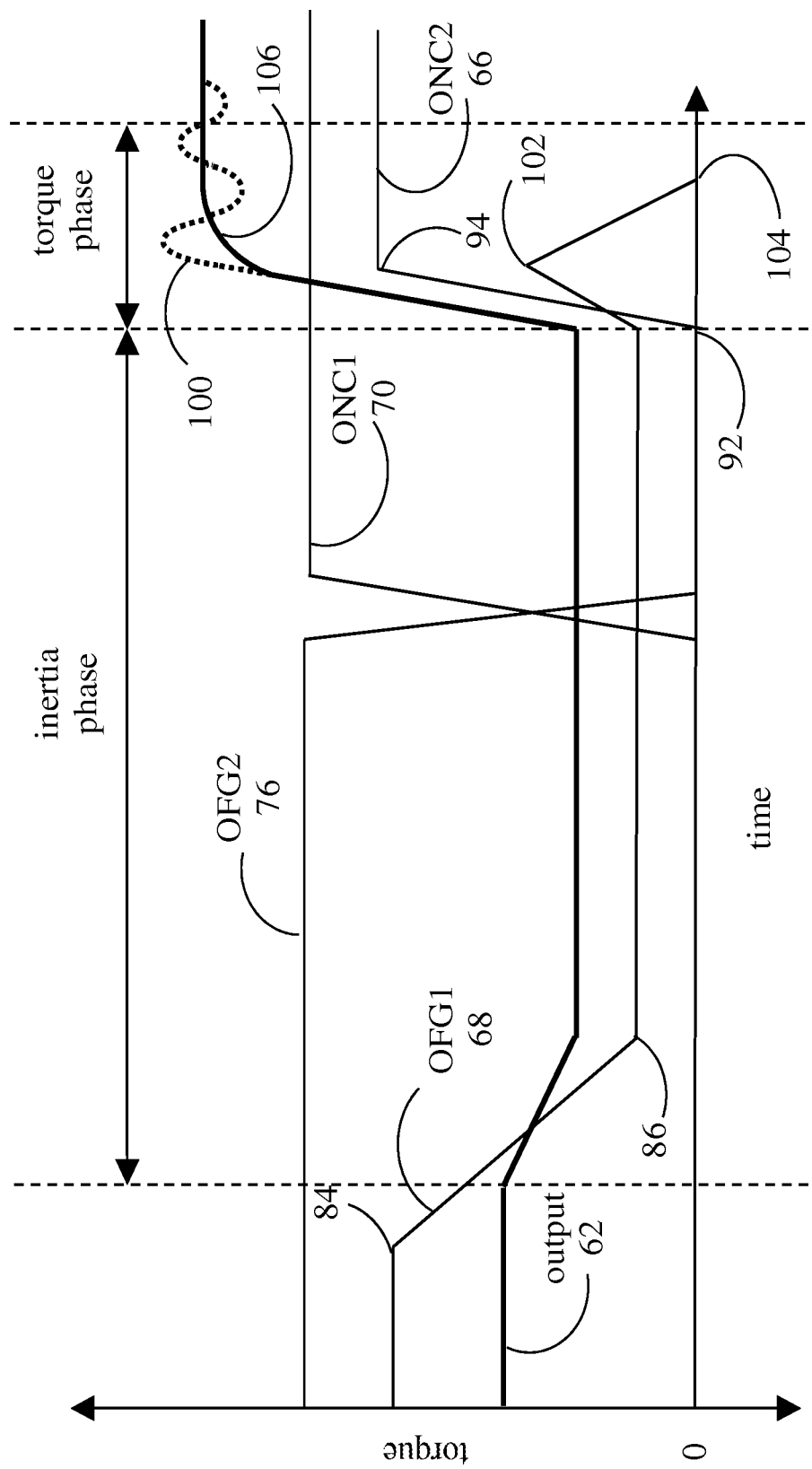
FIG. 3 is a graph illustrating torque relationships during execution of a downshift.
Figure 4:
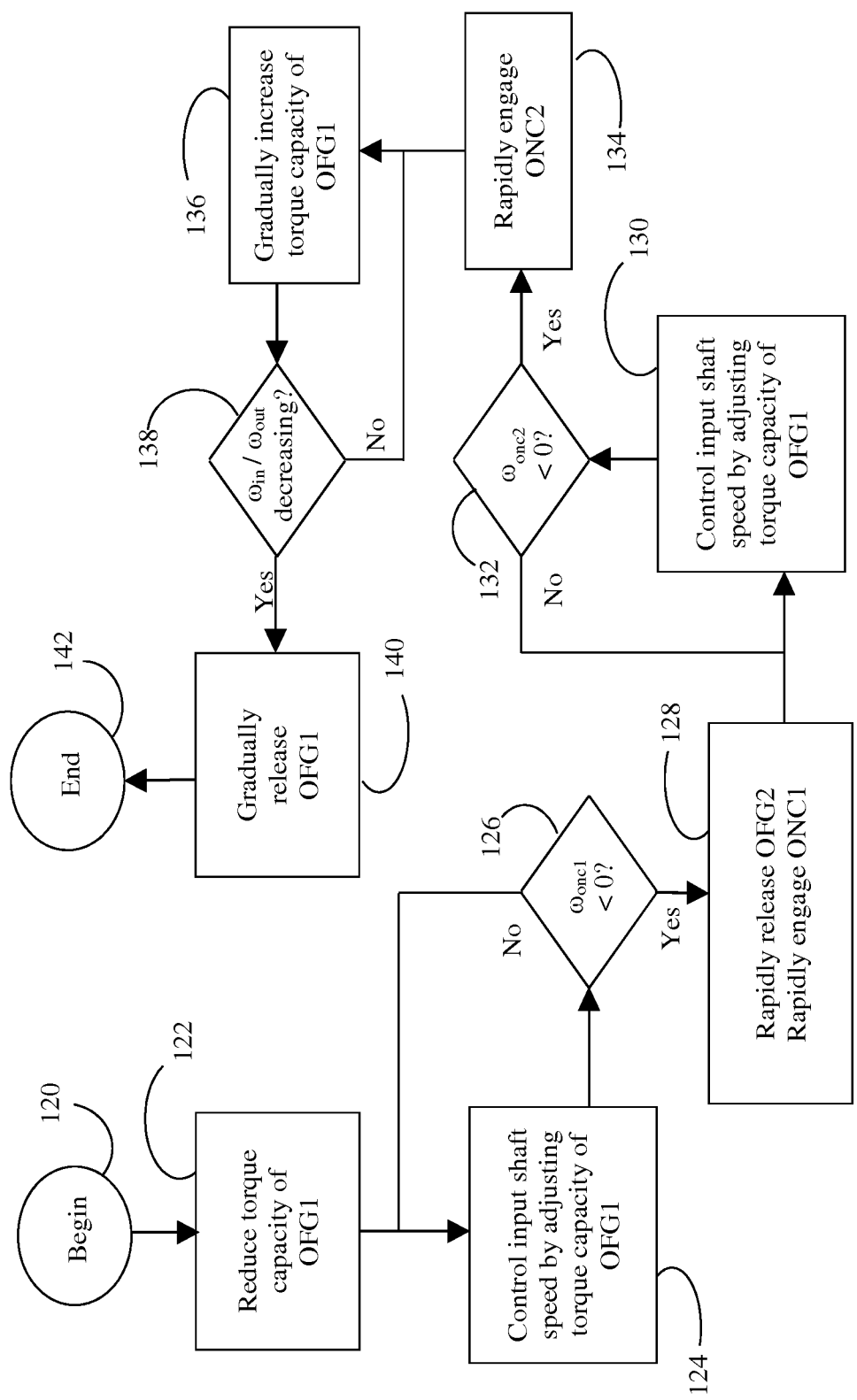
FIG. 4 is a flowchart illustrating a method of shifting.

FIGS. 2 and 3 illustrate speed and torque relationships for a shift from 10th gear to 6th gear in the transmission of FIG. 1. Line 60 in FIG. 2 shows the input speed as a function of time assuming that output speed is substantially constant. The remaining lines depict the relative speeds across various clutches and brakes. The scale is not necessarily identical among lines. Line 62 in FIG. 3 shows the output torque as a function of time assuming that input torque is substantially constant. The remaining lines depict the torque transmitted by various clutches and brakes. Again, the scale is not necessarily identical among these lines. FIG. 4 is a flow diagram illustrating a method of controlling shift elements to effectuate a shift such as the shift illustrated in FIGS. 2 and 3.

The downshift is initiated at 122 in FIG. 4 by gradually reducing the commanded torque capacity of brake 68 (OFG1) as shown between 84 and 86 in FIG. 3. When the torque capacity becomes less than the capacity required to maintain 10th gear, brake 68 will begin to slip and input speed will begin to rise marking the beginning of the inertia phase. As shown by line 62 in FIG. 3, the output torque drops during this phase as power is diverted to increasing engine speed. The torque capacity of brake 68 (OFG1) determines how much the output torque drops and how quickly the engine speed increases as shown at 124 in FIG. 4. If the torque capacity of brake 68 is close to zero, then very little of the engine power will be transmitted to the output but the engine speed will increase rapidly. On the other hand, if the torque capacity of brake 68 is maintained close to the level that brake 68 would transmit in 10th gear, then most of the engine power will be transmitted to the output shaft and engine speed will increase slowly.

As shown in FIG. 2, as the input shaft increases in speed, the speed difference across clutch 70 (ONC1) and brake 66 (ONC2) decrease. During this period, the pressure supplied to clutch 70 and brake 66 may be increased in order to prepare for later engagement, but not enough to exert substantial torque. When the speed difference across clutch 70 (ONC1) reaches zero at 88 in FIG. 2 and at 126 in FIG. 4, the torque capacity of clutch 76 (OFG2) is rapidly ramped to zero and the torque capacity of clutch 70 (ONC1) is rapidly increased as shown at 128 in FIG. 4. The torque capacity of brake 66 (OFG1) continues to control the rate of change of the input speed as shown at 130 in FIG. 4.

When the speed difference across brake 66 (ONC2) reaches zero at 90 in FIG. 2 and at 132 in FIG. 4, the inertia phase ends and the torque phase begins. The torque capacity of brake 66 (ONC2) is rapidly increased between 92 and 94 in FIG. 3 and at 134 in FIG. 4. Engaging brake 66 before point 92 would cause a further reduction in output torque. Because brake 66 does not immediately reach sufficient torque capacity to stop ring gear 28, the direction of rotation of brake 66 may briefly change as shown at 96 in FIG. 2. As shown at 98 in FIG. 2, the input speed may also temporarily exceed the speed associated with the final gear ratio. As brake 66 pulls the input speed back down to it final value, excess energy in various transmission components can result in windup in various shafts such as the vehicle driveshaft. Unless action is taken to dissipate this energy, the output shaft will oscillate as shown by the dotted lines at 100.

Instead of immediately releasing brake 68 (OFG1), the torque capacity of brake 68 is increased at a calibratable rate between 92 and 94 in FIG. 3 and at 136 in FIG. 4. When the input speed begins to decrease at 98 in FIG. 2 and at 138 in FIG. 4, the torque capacity of brake 68 is decreased at a calibratable rate as shown between 102 and 104 in FIG. 3 and at 140 in FIG. 4. Point 102 may also be determined by a change in direction of the relative speed across either offgoing shift element 68 or 76 or of the second oncoming shift element 66. Between points 92 and 104, brake 68 absorbs energy, dampening any oscillation and resulting in the smooth torque transition illustrated at 106 in FIG. 3.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A method of shifting a transmission comprising:
    while operating at a first transmission speed ratio, commanding a sufficient torque capacity of a first offgoing element to prevent slip across the first offgoing element and commanding a zero torque capacity of a first oncoming element;
    during an inertia phase of a downshift from the first transmission speed ratio to a second transmission speed ratio, reducing the torque capacity of the first offgoing element such that slip occurs across the first offgoing element and a ratio of an input speed to an output speed increases; and in response to the ratio of the input speed to the output speed reaching the second transmission speed ratio, increasing the torque capacity of the first offgoing element to absorb excess energy that may excite driveline oscillations and increasing the torque capacity of the first oncoming element to establish the second transmission ratio.

2. The method of claim 1 further comprising:
in response to the ratio of the input speed to the output speed decreasing, reducing the commanded torque capacity of the first offgoing element to zero.

3. The method of claim 1 further comprising:
in response to a slip speed across the first offgoing element decreasing, reducing the commanded torque capacity of the first offgoing element to zero.

4. The method of claim 1 wherein the first offgoing element is a brake.

5. The method of claim 1 wherein the first oncoming element is a clutch.

6. The method of claim 1 further comprising:
while operating at the first transmission speed ratio, commanding a sufficient torque capacity of a second offgoing element to prevent slip across the second offgoing element and commanding a zero torque capacity of a second oncoming element; and during the inertia phase of the downshift from the first transmission speed ratio to the second transmission speed ratio, reducing the torque capacity of the second offgoing element to zero and increasing the torque capacity of the second oncoming element to a sufficient level to prevent slip across the second oncoming element.

7. The method of claim 6 wherein the second offgoing element is a clutch.

8. The method of claim 6 wherein the second oncoming element is a brake.

9. A method of shifting a transmission comprising:
during an inertia phase of a downshift, commanding a positive torque capacity of a first offgoing element;
in response to a transmission speed ratio reaching a downshifted value, increasing the torque capacity of the first offgoing element to absorb excess energy; and
in response to the transmission speed ratio decreasing, reducing the commanded torque capacity of the first offgoing element to zero.

10. The method of claim 9 further comprising:
in response to the transmission speed ratio reaching the downshifted value, increasing a torque capacity of a first oncoming element to a level sufficient to prevent slip across the first oncoming element.

11. The method of claim 9 further comprising:
during the inertia phase of the downshift, releasing a second offgoing element and engaging a second oncoming element.

12. The method of claim 9 further comprising:
during the inertia phase of the downshift, modulating the torque capacity of the first offgoing element to control a rate of increase of the transmission speed ratio.

13. A transmission comprising:
first and second elements; and
a controller programmed to downshift from a first speed ratio in which the first element is engaged and the second element is disengaged to a second speed ratio in which the first element is disengaged and the second element is engaged by commanding an increased torque capacity of the first element during a torque phase to dampen output shaft oscillations resulting from the downshift.

14. The transmission of claim 13 further comprising:
third and fourth element; and
wherein the controller is further programmed to disengage the third element and engage the fourth element during the inertia phase of the downshift.

* * * * *